US011606025B2

(12) United States Patent
Blane

(10) Patent No.: US 11,606,025 B2
(45) Date of Patent: Mar. 14, 2023

(54) BRIDGE RECTIFIER OPERATION AND POWER FACTOR CORRECTION CIRCUIT

(71) Applicant: Raytheon Systems Limited, Essex (GB)

(72) Inventor: Raymond Blane, Glenrothes (GB)

(73) Assignee: Raytheon Systems Limited, Essex (GB)

(*) Notice: Subject to any disclaimer, the term of this patent is extended or adjusted under 35 U.S.C. 154(b) by 0 days.

(21) Appl. No.: 17/365,649

(22) Filed: Jul. 1, 2021

(65) Prior Publication Data

US 2022/0166308 A1  May 26, 2022

(30) Foreign Application Priority Data

Jul. 3, 2020  (GB) .................................. 2010275.2

(51) Int. Cl.
*H02M 1/42* (2007.01)
*H02M 7/219* (2006.01)
*H02M 7/797* (2006.01)

(52) U.S. Cl.
CPC ....... *H02M 1/4225* (2013.01); *H02M 1/4233* (2013.01); *H02M 7/219* (2013.01); *H02M 7/797* (2013.01)

(58) Field of Classification Search
CPC .... H02M 1/42; H02M 1/4225; H02M 1/4233; H02M 7/219; H02M 7/797
See application file for complete search history.

(56) References Cited

U.S. PATENT DOCUMENTS

| 10,720,829 | B1* | 7/2020 | Huang | ................. H02M 1/088 |
| 2017/0294833 | A1* | 10/2017 | Yang | ....................... H02M 7/23 |
| 2021/0226528 | A1* | 7/2021 | Gu | ......................... H02M 7/219 |
| 2021/0313875 | A1* | 10/2021 | Messina | ............. H02M 1/4233 |

FOREIGN PATENT DOCUMENTS

| CN | 111200309 A | 5/2020 |
| EP | 3043460 A1 | 7/2016 |
| WO | 2020056659 A1 | 3/2020 |

OTHER PUBLICATIONS

Xue, et al., "GaN-based High Frequency Totem-Pole Bridgeless PFC Design with Digital Implementation;" 2015 IEEE Applied Power Electronics Conference and Exposition (APEC); Mar. 15, 2015; 8 pages.

* cited by examiner

*Primary Examiner* — Gary L Laxton
(74) *Attorney, Agent, or Firm* — Burns & Levinson LLP; Joseph Maraia

(57) ABSTRACT

A power factor correction "PFC" circuit for use in AC-DC conversion comprises first and second pairs of switches connected across input and output rails in a full bridge configuration, and a controller configured to control the operation of the switches such that one pair of switches is switched on and off at an AC input frequency and the other pair of switches is switched on and off at high frequency; and the switching frequency is alternated between the pairs of switches every n cycles of the AC input/output frequency. The circuit may include inductors on both input rails and may be used in a bidirectional power supply.

14 Claims, 5 Drawing Sheets

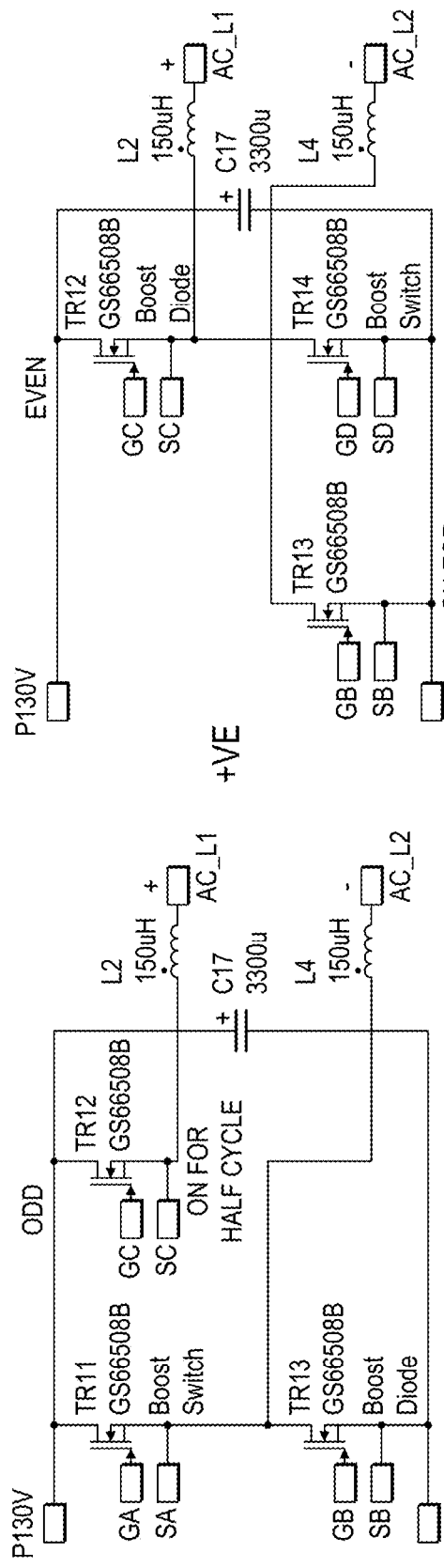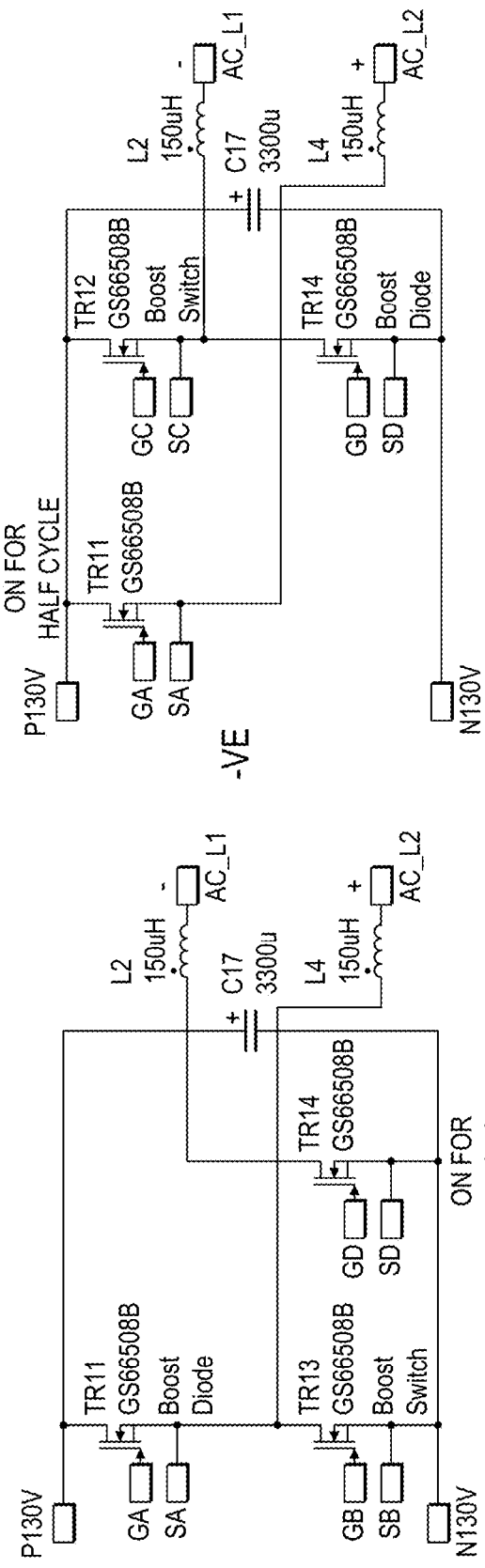

BRIDGE RECTIFIER OPERATION AND POWER FACTOR CORRECTION CIRCUIT

CROSS REFERENCE TO RELATED APPLICATIONS

A claim for priority under 35 U.S.C. § 119 is made to United Kingdom Patent Application No. 2010275.2, filed on Jul. 3, 2020, the entire contents of which are hereby incorporated by reference.

The disclosure relates to the field of power convertor circuits such as AC/DC.

BACKGROUND

In power supply systems, such as AC/DC conversion systems, it is known to include power-factor corrector "PFC" circuitry to improve the efficiency of converting AC to DC. Such circuitry may comprise a diode rectifier bridge.

A particular example of PFC circuitry is the so-called Bridgeless Totem-Pole PFC, or BTP-PFC. In the BTP-PFC topology, one half of a diode rectifier bridge is replaced by active switches in a half bridge arrangement. A pair of diodes and the pair of active switches then form a full bridge. The diodes operate at the AC line frequency and the active switches are switched at a higher frequency, usually at least ten times the AC line frequency, commonly referred to as high frequency switching. The diodes may also be replaced by switches in order to improve efficiency, such as MOSFETs, but due to the different frequencies it is usual for the diodes and the active switches to be formed from different components which can then be optimised for the frequency or any other differences in operating conditions between the diodes and the switches.

SUMMARY

This summary is provided to introduce a selection of concepts in a simplified form that are further described below in the detailed description. This summary is not intended to identify key features or essential features of the claimed subject matter, nor is it intended to be used to determine the scope of the claimed subject matter.

There is provided in the following a method of operating a full bridge rectifier, comprising first and second pairs of switches, for AC to DC conversion. In the method, one pair of switches is switched at the AC line frequency, the other pair of switches is switched at high frequency, and the switching frequency is alternated between the pairs of switches every n cycles of the AC frequency. In other words, the switching frequency of each switch is changed from high frequency to the AC input frequency or vice versa after every n cycles. Thus, the roles of the switches may be reversed between AC cycles.

As a result of the alternation of the switching frequency between one whole cycle and the next (or between n whole cycles and the next n whole cycles) it is possible, but not essential, for the same components to be used at all four switch locations of the rectifier topology since any thermal or other energy losses in the switches are equalised over 2n cycles. For example, high quality MOSFET switches that are capable of fast switching speeds may be used in all four switch locations of the full bridge. The alternation of the switching frequency helps to avoid some components aging faster than others. Without this alternation, if for example high quality MOSFETs were used in all 4 locations (both "legs" of the bridge), there would be unequal thermal loss, and given the same thermal interface, one pair of switches (one bridge leg) would run hotter than the other. The alternation of the roles of the switches allows equal distribution of the thermal loss between all four switching devices yielding improved performance, increased reliability and simplified thermal design.

Embodiments of the invention may comprise manipulation of switching patterns, for example by a controller, e.g. digital controller, to change which pair of switches sees the lower loss that is experienced due to AC line frequency switching. By doing so, the loss in either pair of switches can be controlled, and the temperature of any one pair minimised. As noted above this can (but not necessarily) then allow the use of the same switching devices in all four locations, offering greater reliability because they are cooler and potential cost savings.

Here "n" may be any positive integer, usually but not necessarily 1.

This method of rectifier operation may be implemented in a PFC circuit and embodiments of the invention therefore provide a PFC circuit. In the PFC circuit an inductor is usually provided on at least one or both of the input rails which may be configured to operate in conjunction with the switches as a boost convertor.

The PFC may also be used for DC-AC conversion and thus some embodiments of the invention provide a bidirectional power supply. Here the presence of an inductor on both rails is particularly useful in reducing electromagnetic interference. This is a problem with the use of the known BTP-PFC topology in a bidirectional power supply.

Features of different aspects and embodiments of the invention may be combined as appropriate, as would be apparent to a skilled person, and may be combined with any of the aspects of the invention.

BRIEF DESCRIPTION OF THE DRAWINGS

Embodiments of the invention will be described, by way of example only and with reference to the following drawings, in which:

FIGS. 2A, 2B, 2C, and 2D are circuit diagrams showing a practical implementation of the circuit of FIG. 1 according to some embodiments of the invention;

Figure 1:
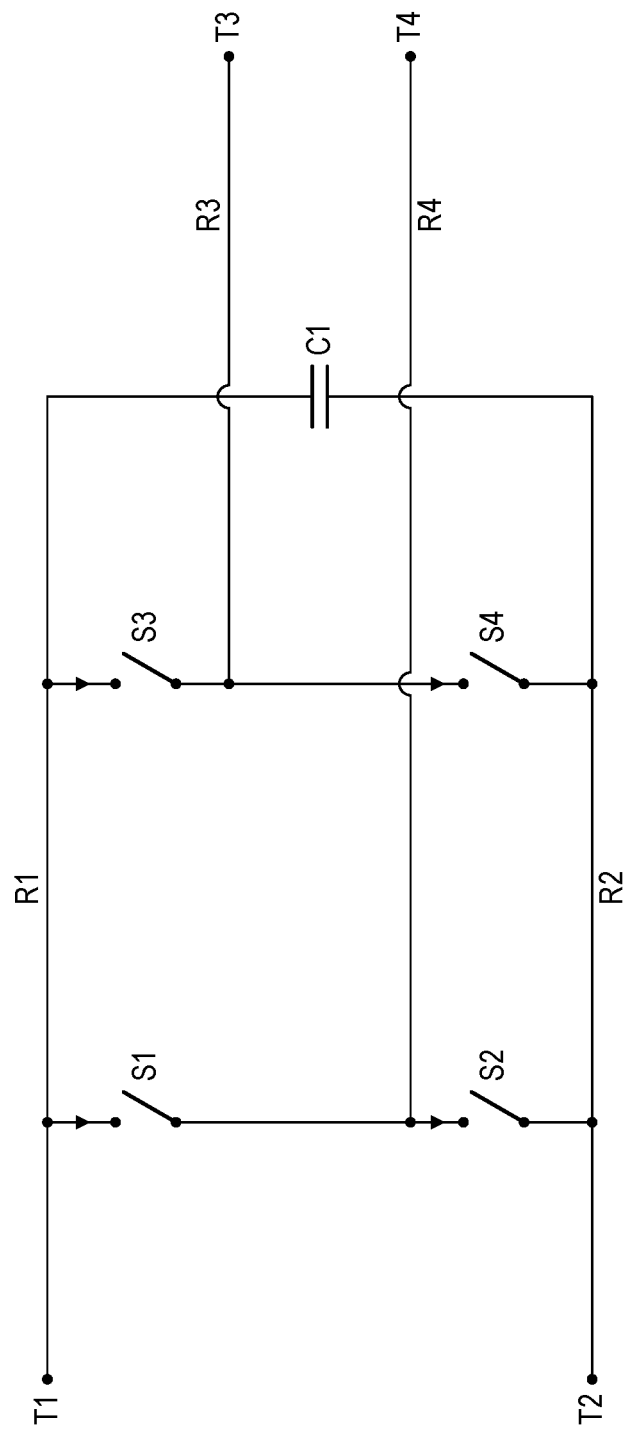
FIG. 1 is a diagram of a full bridge rectifier suitable for use in some embodiments of the invention.

Common reference numerals are used throughout the figures to indicate similar features.

DETAILED DESCRIPTION

Embodiments of the present invention are described below by way of example only. These examples represent the best ways of putting the invention into practice that are currently known to the applicant although they are not the only ways in which this could be achieved.

FIG. 1 is a diagram showing a basic rectifier circuit for the purpose of explaining embodiments of the invention. The circuit may be used in both rectification (AC-DC) and inversion (DC-AC) circuits. In the following, AC-DC is described. It will be understood that for DC-AC the input terminals become output terminals and vice versa.

The circuit of FIG. 1 comprises a pair of DC output rails R1, R2 with output terminals T1, T2 and a pair of AC input rails R3, R4 with input terminals T3, T4. First and second pairs of unidirectional switches, e.g. diodes, S1, S2 and S3, S4 are connected between the terminals across the rails in a full bridge configuration. Thus current can flow in one direction from T3 to R2 via S4 and from R1 to T4 via S1, or in the other direction from T4 to R2 via S2 and from R1 to T3 via S3. An energy storage capacitor C1 is connected between the DC rails. Each switch pair, S1,S2 or S3,S4, forms a half bridge, also referred to in the art as a bridge "leg" between a pair of terminals, in this case the DC terminals T1, T2.

In known AC-DC conversion circuits, one pair of switches is turned off and on at high frequency and an energy storage device such as capacitor C1 may supply power during the non-conduction state of the switches. Thus for example switches S1 and S2 would be switched at high frequency, and switches S3 and S4 would be switched at the desired AC output frequency. Therefore it would be typical for switches S1 and S2 to be different kinds of switches from S3 and S4, as in the example of the BTP-PFC discussed above. As noted above, the high frequency is at least ten times or higher (orders of magnitude higher) than the desired output AC frequency, e.g. at least 500 Hz for 50 Hz AC output. By switching at higher and higher frequencies in a PFC, or other AC-DC conversion circuit, the size of the parts can be reduced so that the volumetric efficiency is improved. Therefore, more commonly, the high frequency is at least 10 kHz and may be as high as 10 MHz.

According to some embodiments of the present invention, the switching frequency is alternated between the pairs of switches every n cycles of the AC frequency. Thus, the roles of the switches S1-S4 may be dynamically allocated. It is well known that a switching operation inherently incurs energy loss, especially thermal energy, in particular so called "edge loss" at the edge of a switch pulse as the state of the switch is changed. One effect of the alternation, or dynamic allocation of switching frequency, is to even out the energy loss across all four switches. If the switching frequencies are changed from high frequency to the AC input frequency or vice versa for each switch after every n cycles, where n is an integer, then after 2×n cycles of the desired output frequency each of the switches will dissipate the same amount of power or thermal energy It will be appreciated that a PFC circuit according to some embodiments of the invention may additionally comprise a controller, for example a digital controller, not shown in FIG. 1, to control the operation of the switches in order to achieve the alternation of switching frequency.

A suitable value for n is 1, and this will be used in the following description. When n=1, the switching frequency of each switch will change with alternate cycles which are therefore referred to as "odd" and "even" cycles for convenience, the designations "odd" and "even" being assigned arbitrarily. However it should be borne in mind that n may be any integer, in which case the odd and even cycles will become alternate occurrences of n consecutive cycles.

Each switch shown in FIG. 1 may be formed from more than one component, for example multiple switching devices in parallel used to accommodate higher current flows. Therefore references to "switch" as used herein, unless otherwise stated, include multiple devices operating together, for example under the same control signal or switching pattern.

A practical implementation of the circuit of FIG. 1 will now be described with reference to FIGS. 2A-2D and FIG. 3. These figures show part of a PFC circuit according to some embodiments of the invention in different states over four half cycles of the AC input voltage, shown in FIG. 3. As noted above, the switching frequency is alternated between the pairs of switches every n cycles of the AC frequency. FIGS. 2A-2D and FIG. 3 show an example where n=1.

Figure 3:
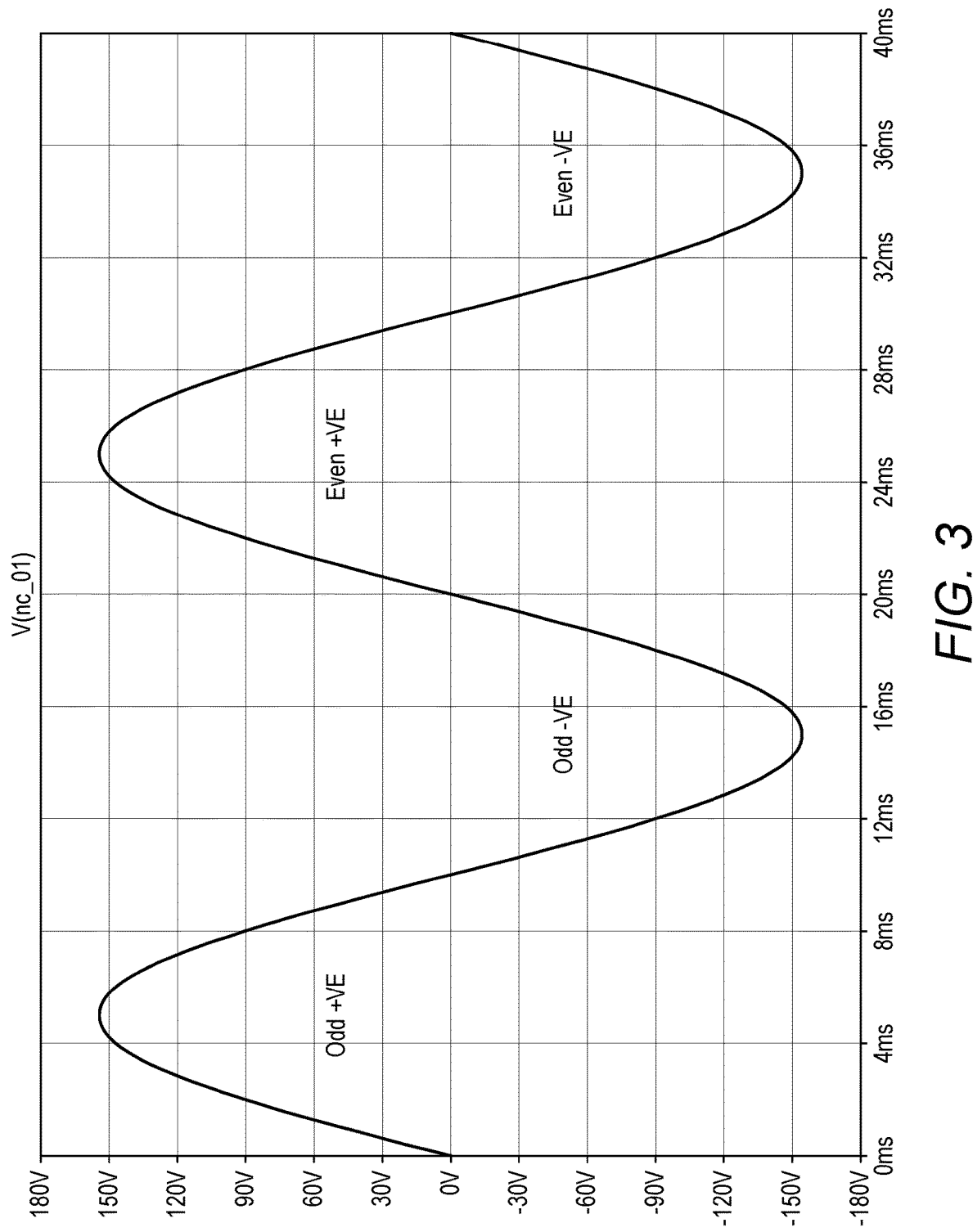
FIG. 3 is a graph showing four half cycles of an AC input voltage to illustrate the operation of the circuit of FIGS. 2A-2D.

In the circuits shown in FIGS. 2A-2D, transistors TR11, TR12, TR13 and TR14 correspond respectively to switches S1-S4 of FIG. 1 and capacitor C17 corresponds to capacitor C1 of FIG. 1. Transistors that are not in an ON state for any half cycle are not shown for the sake of clarity. In FIG. 3, consecutive cycles are denoted odd and even. FIG. 2A shows the state of transistors TR11-TR14 in an odd positive half cycle, FIG. 2B the following odd negative half cycle, FIG. 2C the following even positive half cycle and FIG. 2D the following even negative half cycle.

In the odd positive half cycle as shown in FIG. 2A, transistor TR12 is ON for the whole of the half cycle and transistors TR11 and TR13 are switched at high frequency. In the odd negative half cycle as shown in FIG. 2B transistor TR14 is ON for the whole of the half cycle and transistors TR11 and TR13 continue to be switched at high frequency. In the even cycle the roles of the transistors are reversed as shown in FIGS. 2C and 2D. TR14 and TR12 are switched at high frequency and TR11 and TR12 are ON for full positive and negative half cycles respectively.

The controlling signals for the transistors TR11 to TR14 are applied to the G terminals with respect to the S terminals, indicated as gate and source blocks GA, SA, for TR11; GB, SB, for TR13; GC, SC for TR12 and GD, SD for TR14. The switching frequencies, or the roles of the respective switches, in this example transistors TR11-TR14, can be achieved through the drive pattern to the respective switches, i.e. the gate drive pattern in the case of FETs. The switching frequencies of the respective switches may be controlled by a digital controller, not shown in FIGS. 2A-2D, which may also control the duty cycles of the respective switches.

In all of the embodiments described here, the four switches comprising the two pairs of switches forming the bridge legs, e.g. transistors, may be formed from identical or similar components. For example they may all be rated for the high switching frequency. Any suitable switching components may be used, for example but not limited to MOS-FETs, insulated-gate bipolar transistors "IGBTs", and silicon carbide switches. GaN devices are examples of MOSFETs having high switching speed capability.

According to some embodiments of the invention an inductor may be provided on one or both of the input rails. The inductor or inductors typically operate, in conjunction with the high frequency switched pair, as a boost convertor. In the illustrated embodiments the inductors have the same inductance and may comprise two separate identical components which may share a common magnetic core.

The partial circuits shown in FIGS. 2A-2D also include inductors L2 and L4 on the respective AC input rails between input terminals AC_L1, AC_L2 and the respective bridge legs, or the junctions between the respective switch pairs. The two inductors, in conjunction with the high frequency switch pair, operate as a boost convertor, as is known in the art, to achieve a higher DC output voltage than the peak AC input voltage. In a conventional boost convertor, a diode or other one way device connects the inductor to the output and a switch connects the inductor to the opposite input terminal. In the circuit of FIGS. 2A-2D, two line inductors are not essential for the circuit to operate as a boost convertor, and either of the inductors could be omitted.

As shown in FIGS. 2A-2D, the roles of the respective switches alternate between boost switch and boost diode between successive half cycles and therefore, as is known in the operation of boost convertors, the ON/OFF duty cycle of the switch pair being switched at high frequency will alternate from one half cycle to the next, i.e. from the positive half cycle to the negative and vice versa. Therefore, to take TR11 as an example, the role of this switch changes from boost switch, to boost diode, to OFF and then to ON over four half cycles of the input AC voltage frequency.

More generally, in the circuit shown in FIGS. 2A-2D the switch, e.g. transistor, function is allocated dynamically according to either odd or even input, e.g. mains, cycle (determined arbitrarily) and to positive or negative voltage (determined already by circuit function). The roles of the switches alternate between boost diode and boost switch from the positive AC half cycle to the negative AC half cycle or from the negative AC half cycle to the positive half cycle, or both if n is greater than 1.

In an alternative embodiment where n is greater than 1, the role of one switch would change from boost switch to boost diode after each half cycle, e.g. each transition from positive to negative or vice versa, i.e. change in polarity, for n half cycles and then from ON to OFF after each half cycle for the next n half cycles.

The circuits described herein may also be used in DC-AC conversion, i.e. in inverters, as will be described further below. Thus they may form part of a bidirectional power supply. The inclusion of an inductor on each of the input rails, rather than on only one rail, aids the electromagnetic interference (EMI) performance of the circuit in both AC-DC mode and in DC-AC mode. Neither of inductors L2 and L4 is required unless boost or buck (see below) conversion is to be achieved, and for boost conversion only one may be provided. For either boost or buck function a minimum of one inductor L2 or L4 is required. However, to aid, i.e. reduce, EMI two inductors L2 and L4 may be used.

As noted elsewhere here, the circuits shown in FIGS. 1 and 2 may be implemented in a power factor correction circuit, for example as part of an AC-DC convertor.

Figure 4:
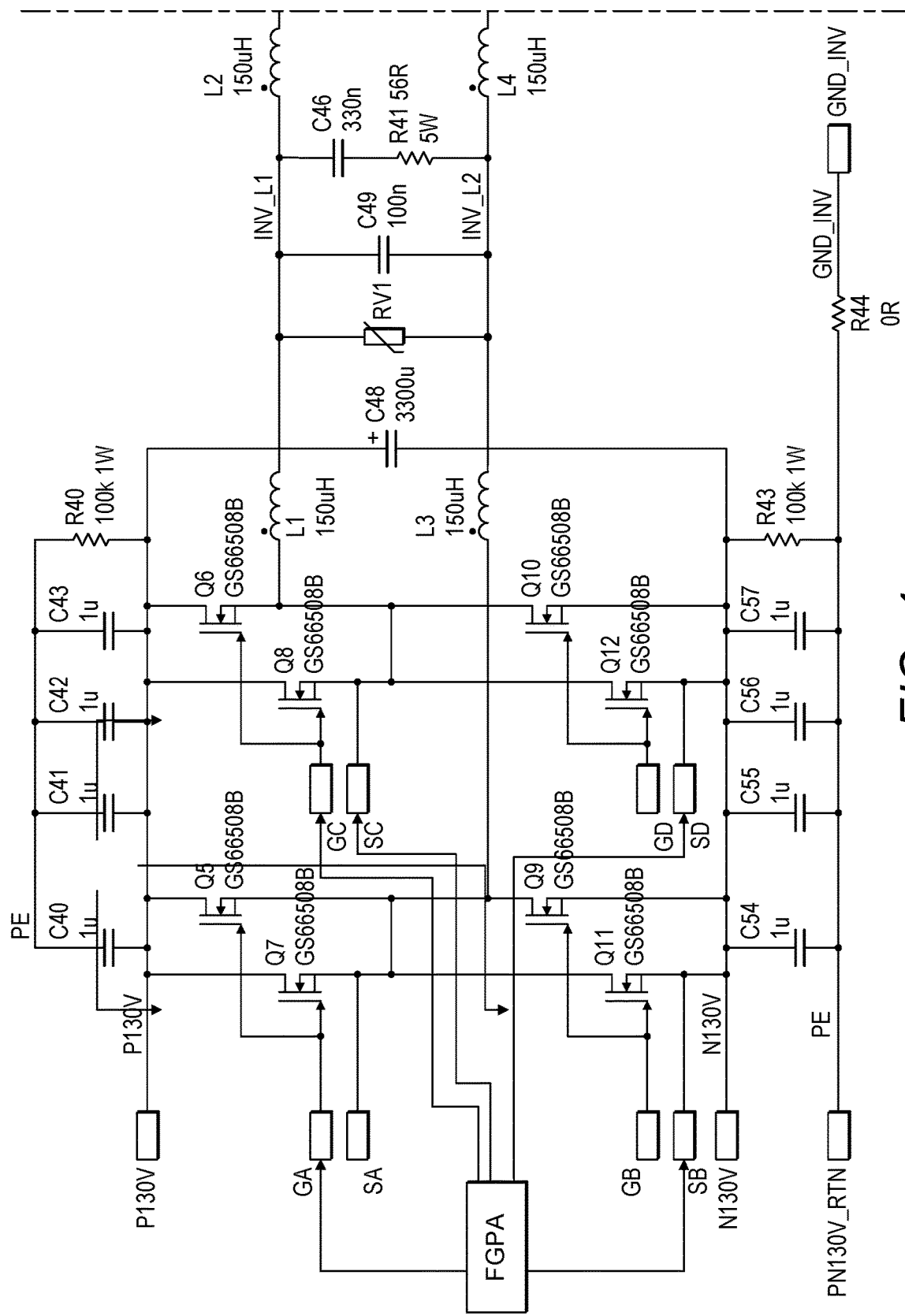
FIG. 4 is a circuit diagram of a power factor correction circuit according to some embodiments of the invention.
Figure 4:
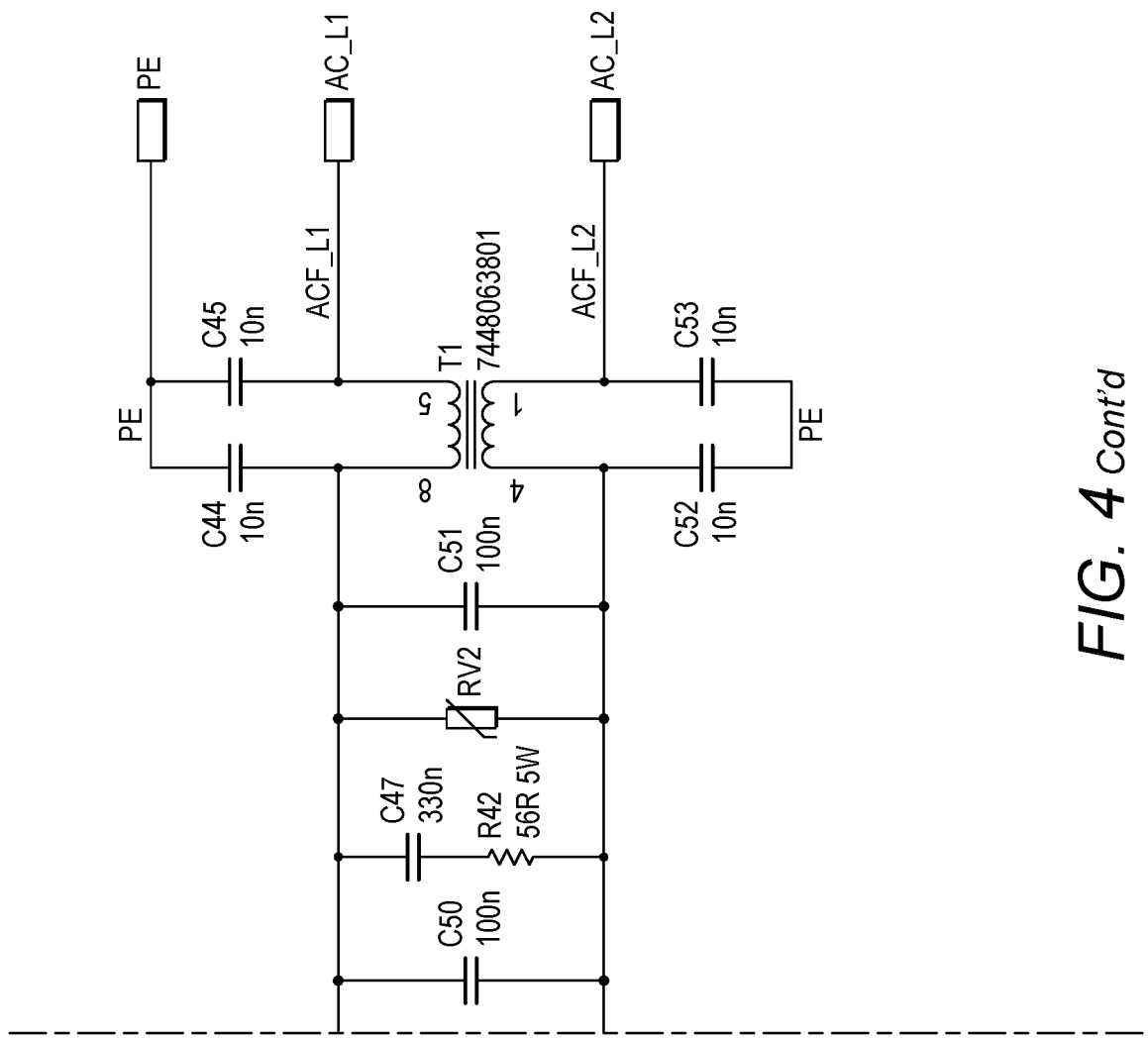

FIG. 4 shows a power factor correction circuit in further detail, according to some embodiments of the invention. The circuit of FIG. 4 may be operated as part of a bidirectional power supply and therefore may operate as a rectifier or as an inverter.

Some general points in connection with the circuit of FIG. 4 should be noted. Sampling functions may be provided, as known in the art, to facilitate full closed loop control of output voltages. These are not shown in FIG. 4. R44 has been added to provide a reference point, where the input and output voltages may be measured (for the purposes of closed loop control) with respect to.

As noted above, the switching frequency is typically at least ten times larger than the AC input frequency. The same applies when the circuit is operated as an inverter—the switching frequency is very much higher than the AC output frequency. The filter cut-off frequency of the two stage filter formed by L1, L3 & C49 (1st stage) and L2, L4 & C50 (2nd stage) is higher than the line in/out frequency but lower than the switching frequency. A two stage filter is not essential and the same can be achieved with one filter stage. Therefore L2, L4 and C50 may be omitted.

To handle high power loads it may be necessary to use multiple switching devices in parallel to permit them to current share. The circuit of FIG. 4 shows two GaN switching devices in parallel at each switch location of the bridge rectifier, namely Q5/Q7, Q9/Q11 forming a pair corresponding to the pair S1, S2 of FIG. 1 or pair TR11, TR13 of FIGS. 2A-2D, and Q6/Q8, Q10/Q12 corresponding to the pair S3,S4 of FIG. 1 or TR12, TR14 of FIGS. 2A-2D. When reference is made in the description of FIG. 4 to a specific transistor the lower numbered one of a paralleled pair will be referenced. It can be assumed that the other parallel device will ALWAYS be in the same state (ON or OFF) as the referenced device.

DC to AC Conversion:

The circuit of FIG. 4 operates to convert DC to AC in generally the same manner as a synchronous buck convertor, as known to those skilled in the art, to step down the input DC voltage. However embodiments of the invention are not limited to step down DC to AC conversion.

The circuit of FIG. 4 when operated for DC to AC conversion differs from a known synchronous buck convertor in that the output filter comprises two inductors L1 and L3, and additional switches, transistor switches as shown in FIG. 4, to enable the voltage to be driven both positive and negative in order to generate an AC voltage with respect to a DC supply midpoint.

The resultant AC output voltage zero crossing value will be positioned at exactly half-way up the DC supply voltage. For this reason the DC rails on the left in FIG. 4 are labelled as P130V and N130V so that the DC midpoint (essentially 0 V DC) is the same as the AC zero crossing point (0 V AC is achieved when the duty ratio of the transistors is exactly 50%).

The DC power source (whose DC value is higher than the peak of the AC sinusoid to be generated) is applied to the P130V and N130V ports. Capacitor C48 provides local energy storage such that the DC supply current is smoothed out somewhat as the AC current rises and falls in concert with the AC output voltage. Capacitors C40-43 together with resistor R40 and C54-57 together with resistor R43 provide local decoupling for the switching transistors Q5-Q12.

Inductors L1, L3 and capacitor C49 form a low pass filter. Capacitor C46 and resistor R41 form a damping network to prevent inductors L1, L3 and capacitor C49 ringing. Inductors L2, L4 and capacitor C898 form a second low pass filter to further attenuate switching frequency ripple. Capacitor C47 and resistor R42 form a second damping network. RV1 and RV2 are varistors which act to clamp high voltages generated by the filter inductors L1, L3 in the event that the load is disconnected suddenly. Transistor T1 and associated capacitors C51, C44, C45, C52, C53 form a common-mode EMI filter (whose operation is not relevant to the application here).

A controller as known in the art provides source and gate drive signals to source drive blocks SA, SB, SC, SD and gate drive blocks GA, GB, GC, GD. The controller could be any suitable controller including but not limited to a microprocessor, digital signal processor "DSP", application specific integrated circuit "ASIC", dedicated control integrated circuit or as shown in FIG. 4 a field-programmable gate array "FGPA".

In the case of an FGPA controller and the transistors being GaN devices, the gate drive blocks GA, GB, GC, GD serve to boost the logic level signals generated by the FPGA controller to drive levels adequate for the GaN devices whilst also providing galvanic isolation. Their primary characteristics are:

High current gain
Low propagation delay

Fast rise and fall times
Galvanic isolation
Controlled turn-on and off voltages.

The digital controller creates Pulse Width Modulated signals to drive the transistors ON and OFF at a predetermined switching frequency and with a duty ratio governed for example by a closed loop controller. Opposing switches of each pair are switched with a first duty cycle and the other two switches are switched with a second duty cycle, and the first and second duty cycles of the switches are alternated for each change in polarity of the AC voltage. An example of the switching is as follows: For the positive half cycles (when AC_L1 is positive with respect to AC_L2) then Q6 and Q9 switched on and off at high frequency so as to be driven ON for >50% of the switching period and therefore Q5 and Q10 are switched on and off at high frequency to be driven ON for <50% of the switching period. Similarly for the negative half cycles (when AC_L2 is positive with respect to AC_L1) then Q5 and Q10 are driven ON for >50% of the switching period and therefore Q6 and Q9 are driven ON for <50% of the switching period.

The LC filters (L1, L3, C48, C49 described above) average out the applied rectangular waveform to produce a smoothed voltage. A digital sinewave reference is created and a sample of the filtered output voltage is fed back to a proportional-integral "PI" or proportional-integral-differential "PID" controller block to provide full closed-loop control of the output voltage. This is well known in the art and the control block is not included in the figures. Because of the closed loop the duty ratio of the transistors ON time is controlled which creates a sinusoidal output voltage.

In this mode all transistors operate with the same average power (when averaged over a full output cycle).

AC to DC Conversion:

The circuit of FIG. 4 may be used for AC-DC conversion. In this power conversion mode the circuit operates with the same essential characteristics as a boost converter, as noted in connection with FIGS. 2A-2D. Again it should be noted here that embodiments of the invention are not limited to boost or step-up conversion.

There are some notable differences between the circuit of FIG. 4 operating as a convertor and a known boost convertor: the boost inductor comprises inductors L1, L3 on the output rails and there are additional transistor switches to create the full-bridge topology, for example similar to the Bridgeless Totem Pole Power Factor Corrector.

The same digital controller as for DC to AC conversion, the FPGA in FIG. 4, may also create Pulse Width Modulated signals to drive the transistors. However, for this topology there are two control loops as is known in AC-DC conversion, and specifically PFC: an inner current loop (bandwidth approximately ¹⁄₁₀th the switching frequency) which forces the line current to follow the same shape as the line voltage (the line voltage is used as a reference) and an outer voltage loop (very bandwidth limited) which forces the output voltage to be correct when averaged over several tens of line frequency cycles (this action allows the converter to account for changes in output loading). An AC voltage is applied at AC_L1 and AC_L2 and the resultant DC output voltage appears at P130V and N130V. In the case of a boost convertor, that the DC output voltage will always be higher than the peak of the applied AC due to the boost function in the PFC.

In a conventional AC-DC convertor, one of the half-bridges (e.g. formed from Q5/Q9) would be formed using GaN devices or other devices having excellent high speed properties, and the other half-bridge (Q6/Q10) would be formed from conventional silicon devices where speed is not important. In a typical operating mode, the low speed silicon devices would be commutated once every 10 ms (50 Hz) or 8.3333 ms (60 Hz). The GaN devices would be switched at high speed (100 kHz or more) and the inner current loop would force the line current to be the same shape as the line voltage. Inductors L1 and L3 form the inductive element of a boost converter to step the output voltage up to a level higher than the peak of the applied line voltage. L2 and L4 form an EMI/ripple filter.

According to some embodiments of this invention, all fours switching positions of the bridge rectifier may be occupied by the same kinds of switching device, for example identical devices, such as GaN devices. A switching device (one of the four depending upon the instantaneous polarity of the applied AC waveform and whether the cycle is (arbitrarily) an even or odd numbered cycle) is still turned ON for half the mains cycle (low frequency operation). Its opposite counterpart is always OFF for the entire half cycle. The other two switching devices may operate at high speed to create the sinusoidal current waveform. Their roles may also change from boost switch to boost diode or vice versa at the zero-crossing. Then for the next mains cycle the high speed and low speed device roles are swapped. Thus over two mains cycles the thermal dissipation in the four devices is essentially the same (assuming no load or line changes across the two cycles). As noted above, the role change may occur every n cycles and need not change after every whole cycle.

Some embodiments of the invention may be implemented in an existing rectifier circuit by a suitable method of operation, for example application of suitable digital control signals. Thus the invention in some aspects may be regarded as a digital control method or technique. The method may be summarised as:

A method of operating a rectifier comprising first and second pairs of switches in a bidirectional power supply comprising:

for AC-DC conversion:
switching on and off both switches of the first pair of switches at the AC line frequency,
switching on and off both switches of the second pair of switches at high frequency, and
alternating the switching frequency between the pairs of switches every n cycles of the AC frequency.

The same circuit may be used for DC-AC conversion as is known in the art:
switching opposing switches in each pair with a first duty cycle and the other switches in each pair with a second duty cycle, and
alternating the first and second duty cycles of the switches for each change in polarity of the AC output voltage.

It will be understood that the benefits and advantages described above may relate to one embodiment or may relate to several embodiments. The embodiments are not limited to those that solve any or all of the stated problems or those that have any or all of the stated benefits and advantages.

Any reference to "an" item or "piece" refers to one or more of those items unless otherwise stated. The term "comprising" is used herein to mean including the method steps or elements identified, but that such steps or elements do not comprise an exclusive list and a method or apparatus may contain additional steps or elements.

Further, to the extent that the term "includes" is used in either the detailed description or the claims, such term is intended to be inclusive in a manner similar to the term "comprising" as "comprising" is interpreted when employed as a transitional word in a claim.

FIGS. 2A-2D and 4 include component values for the purpose of illustration of embodiments of the invention and it will be appreciated that different component values may be used in other embodiments.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A power factor correction "PFC" circuit for use in AC-DC conversion
   comprising first and second pairs of switches connected across input and output rails in a full bridge configuration, and a controller configured to control an operation of the switches such that:
   one pair of the first and second pairs of switches is switched on and off at an AC input frequency of an AC input signal and the other pair of the first and second pairs of switches is switched on and off at high frequency; and
   a switching frequency is alternated between the first and second pairs of switches every n cycles of the AC input frequency where n is an integer;
   wherein an ON/OFF duty cycle of the pair being switched at high frequency of the first and second pairs of switches is alternated between one half cycle of the AC input signal and a next half cycle.

2. The PFC of claim 1 wherein four switches forming the first and second pairs of switches are formed from components rated for switching at the high frequency.

3. The PFC of claim 2 wherein the four switches are formed of identical components.

4. The PFC circuit of claim 1 comprising an inductor on one or both of AC input rails.

5. The PFC of claim 4 wherein the inductor is configured to operate, in conjunction with the pair being switched at high frequency, as a boost convertor.

6. The PFC of claim 5 wherein the controller is configured to control the operation of the pair being switched at high frequency so that a first switch of the pair operates as a boost diode and a second switch of the pair operates as a boost switch, with roles of the first switch and the second switch being reversed with a change in polarity of the AC input signal.

7. A bidirectional power supply comprising a PFC as claimed in claim 1.

8. The bidirectional power supply of claim 7 comprising an inductor on each input rail of AC input rails.

9. The bidirectional power supply of claim 8 wherein an inductance of the inductors on each input rail is the same.

10. The bidirectional power supply circuit as claimed in claim 7 wherein the controller is configured to operate four switches comprising a first pair of switches including a first switch and a second switch and a second pair of switches including a third switch and a fourth switch for DC-AC conversion by switching opposing switches in each pair including the second switch and the third switch with a first duty cycle and the other switches in each pair including the first switch and the fourth switch with a second duty cycle, and alternating the first and second duty cycles of the opposing switches and the other switches for each change in polarity of an AC output voltage.

11. A method of operating a bridge rectifier comprising first and second pairs of switches, for AC to DC conversion, wherein one pair of the first and second pairs of switches is switched at an AC line frequency, the other pair of the first and second pairs of switches is operated at high frequency, and a switching frequency is alternated between the first and second pairs of switches every n cycles of the AC line frequency where n is an integer;
   wherein an ON/OFF duty cycle of the pair being switched at high frequency of the first and second pairs of switches is alternated between one half cycle of the AC input and a next half cycle.

12. The method of claim 11 wherein an inductor is provided on one or both AC input lines to a bridge rectifier and the pair of switches being switched at the high frequency is operated with the inductor as a boost convertor.

13. The method of claim 12 wherein for the pair of switches being switched at the high frequency, the roles of the switches alternate between a boost diode and a boost switch from one of a positive AC half cycle to a negative AC half cycle and the negative AC half cycle to the positive AC half cycle.

14. A method of operating a rectifier comprising first and second pairs of switches in a bidirectional power supply comprising:
   for AC-DC conversion:
   switching one pair of the first and second pairs of switches at an AC input frequency, operating the other pair of the first and second pairs of switches at a high frequency, and alternating the AC input frequency and the high frequency between the first and second pairs of switches every n cycles of the AC input frequency where n is an integer;
   for DC-AC conversion:
   the first pair of switches including a first switch and a second switch and the second pair of switches including a third switch and a fourth switch, switching opposing switches in each pair including the second switch and the third switch with a first duty cycle and the other switches in each pair including the first switch and the fourth switch with a second duty cycle, and
   alternating the first and second duty cycles of the opposing switches and the other switches for each change in polarity of an AC output voltage.

* * * * *